US012783956B2

(12) United States Patent
Hard et al.

(10) Patent No.: US 12,783,956 B2
(45) Date of Patent: Nov. 3, 2026

(54) UTILIZING ELASTIC WEIGHT CONSOLIDATION (EWC) LOSS TERM(S) TO MITIGATE CATASTROPHIC FORGETTING IN TRAINING MACHINE LEARNING MODEL(S)

(71) Applicant: GOOGLE LLC, Mountain View, CA (US)

(72) Inventors: Andrew Hard, Menlo Park, CA (US); Kurt Partridge, San Francisco, CA (US); Sean Augenstein, San Mateo, CA (US); Rajiv Mathews, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 510 days.

(21) Appl. No.: 18/365,487

(22) Filed: Aug. 4, 2023

(65) Prior Publication Data

US 2025/0045627 A1 Feb. 6, 2025

(51) Int. Cl.
*G06N 20/00* (2019.01)

(52) U.S. Cl.
CPC .................................. *G06N 20/00* (2019.01)

(58) Field of Classification Search
CPC ......... G06N 20/00; G06N 3/098; G06N 3/084
USPC ........................................................ 706/12
See application file for complete search history.

(56) References Cited

U.S. PATENT DOCUMENTS

| | | | | |
|---|---|---|---|---|
| 2010/0262454 A1* | 10/2010 | Sommer | G06F 16/355 | 706/55 |
| 2011/0125685 A1* | 5/2011 | Rizvi | G06N 3/086 | 706/19 |
| 2012/0303557 A1* | 11/2012 | Lu | G06N 20/10 | 706/12 |
| 2021/0158216 A1 | 5/2021 | Du | | |
| 2023/0117768 A1* | 4/2023 | Shaloudegi | G06N 20/00 | 706/12 |
| 2023/0177382 A1* | 6/2023 | Beaufays | H04L 67/10 | 706/12 |

OTHER PUBLICATIONS

Jhunjhunwala Divyansh et al: "Towards a Theoretical and Practical Understanding of One-Shot Federated Learning with Fisher Information", Jul. 21, 2023 (Jul. 21, 2023), XP093213647 (Year: 2023).*

(Continued)

*Primary Examiner* — Usman A Khan
(74) *Attorney, Agent, or Firm* — Gray Ice Higdon

(57) ABSTRACT

Processor(s) of a client device can receive global weights of a global ML model from a remote system, obtain a client device data set, determine a Fisher information matrix for the client data set, and transmit the Fisher information matrix for the client data set to the remote system. Further, processor(s) of the remote system can determine a corresponding elastic weight consolidation (EWC) loss term for each of the global weights based on at least the Fisher information matrix, generate a server update for the global ML model based on (i) processing server data remotely at the remote system and using the global ML model and (ii) based on the corresponding EWC loss term for each of the global weights, and update the global weights of the global ML model based on the server update.

17 Claims, 5 Drawing Sheets

(56) References Cited

OTHER PUBLICATIONS

Jhunjhunwala, D. et al., "Towards a Theoretical and Practical Understanding of One-Shot Federated Learning with Fisher Information"; Workshop of Federated Learning and Analytics in Practice; International Conference on Machine Learning; 19 pages; dated Jul. 21, 2023.
Kirkpatrick, J. et al., "Overcoming catastrophic forgetting in neural networks"; Proceedings of the National Academy of Sciences, vol. 114, No. 13; pp. 3521-3526; dated Mar. 14, 2017.
European Patent Office; International Search Report and Written Opinion issued in Application No. PCT/US2024/036743; 16 pages; dated Oct. 29, 2024.
Kirkpatrick, et al.; Overcoming Catastrophic Forgetting in Neutral Networks; DeepMind London; Bioengineering Department, Imperial College; arXiv:1612.00796v2; 13 pages; dated Jan. 25, 2017.
Augenstein et al., "Jointly Learning from Decentralized (Federated) and Centralized Data to Mitigate Distribution Shift" arXiv:2111.12150v1 [cs.LG] 9 pages, dated Nov. 23, 2021. Nov. 23, 2021.
Yao et al., "Continual Local Training For Better Initialization of Federated Models" arXiv:2005.12657v1 [cs.LG] 5 pages, dated May 26, 2020. May 26, 2020.
Shoham et al.; Overcoming Forgetting in Federated Learning on Non-IIC Data; ARXIV.org; Cornell University Library; 201 Olin Library Cornell University Ithaca; 12 pages; dated Oct. 17, 2019.
Tan, A.Z. et al., "Towards Personalized Federated Learning"; arXiv.org, Cornell University Library, arXiv:2103.00710v2; 19 pages; dated Jan. 19, 2022.
Zhou, J. et al., "A Survey on Federated Learning and its Applications for Accelerating Industrial Internet of Things"; arXiv.org, Cornell University Library, arXiv:2104.10501; 13 pages; dated Apr. 21, 2021.

* cited by examiner

UTILIZING ELASTIC WEIGHT CONSOLIDATION (EWC) LOSS TERM(S) TO MITIGATE CATASTROPHIC FORGETTING IN TRAINING MACHINE LEARNING MODEL(S)

BACKGROUND

Decentralized learning of machine learning (ML) model(s) is an increasingly popular ML technique for updating ML model(s) due to various privacy considerations. In one common implementation of decentralized learning, an on-device ML model is stored locally on a client device of a user, and a global ML model, that is a cloud-based counterpart of the on-device ML model, is stored remotely at a remote system (e.g., a server or cluster of servers). During a given round of decentralized learning, the client device can check-in to a population of client devices that will be utilized in the given round of decentralized learning, download a global ML model or weights thereof from the remote system (e.g., to be utilized as the on-device ML model), generate an update for the weights of the global ML model based on processing instance(s) of client data locally at the client device and using the on-device ML model, and upload the update for the weight of the global ML model back to the remote system and without transmitting the instance(s) of the client device. The remote system can utilize the update received from the client device, and additional updates generated in a similar manner at additional client devices and that are received from the additional client devices, to update the weights of the global ML model.

Generally, the global ML model is initially trained at the remote system prior to the decentralized learning and based on server data that is available to the remote system. Thus, the decentralized learning of the global ML model as described above is generally for fine-tuning the global ML model. However, the distribution of data differs between the server data that is generally utilized to initially train the global ML model and the client device that is generally utilized by the respective client devices in subsequently generating updates for fine-tuning the global ML model. As a result, the global ML model can catastrophically forget information learned during the initial training and based on the server data. Accordingly, there is a need in the art for techniques to mitigate and/or eliminate catastrophic forgetting of the global ML model during the subsequent fine-tuning of the global ML model using decentralized learning.

SUMMARY

Implementations disclosed herein are directed to implementing various techniques in decentralized learning of machine learning (ML) model(s) to mitigate and/or eliminate catastrophic forgetting of the ML model(s). Client device processor(s) of a client device can receive global weights of a global ML model from a remote system, obtain a client device data set that is accessible at the client device and that is not accessible by the remote system, determine a Fisher information matrix for the client data set based on the global weights of the global ML model, and transmit the Fisher information matrix for the client data set to the remote system. Further, remote system processor(s) of the remote system can determine a corresponding elastic weight consolidation (EWC) loss term for each of the global weights based on the Fisher information matrix received from the client device and based on additional Fisher information matrices received from corresponding additional client devices, generate a server update for the global ML model based on (i) processing server data remotely at the remote system and using the global ML model and (ii) based on the corresponding EWC loss term for each of the global weights, and update the global weights of the global ML model based on the server update to generate an updated global ML model.

In various implementations, and prior to the client device processor(s) receiving the global weights of the global ML model, the remote system processor(s) can cause the global ML model to be pre-trained in a decentralized manner during a plurality of rounds of decentralized learning. Put another way, rather than the global ML model being initially trained via centralized learning at the remote system and then fine-tuned via decentralized learning, techniques described herein initially train the global ML model via decentralized learning and then fine-tune the global ML model via centralized learning at the remote system. During a given round of decentralized learning, the remote system processor(s) can identify a plurality of client devices that will participate in the given round of decentralized learning, transmit the global weights of the global ML model to each of the plurality of client devices, and receive a corresponding client device update (e.g., a client gradient) for the global ML model from a given client device of the plurality of client devices. The corresponding client update can be generated locally at the given client device based on processing client device data that is accessible locally at the client device and that is not accessible at the remote system, using the global ML model. Further, the remote system processor(s) can update the global weights of the global ML model based on the corresponding client device update received from the given client device and additional corresponding client device updates received from other client devices included in the plurality of client devices. This pre-training via decentralized learning can continue, for example, until the global ML model achieves a sufficiently low loss.

Notably, the Fisher information seeks to measure the amount of information that an observable random variable carries about an unknown parameter of a distribution, and the Fisher information matrix may be computed as an expectation value of this measure represented in matrix form (e.g., a Hessian matrix). Put another way, the Fisher information matrix provides a statistical measure for the client data set (or other similar client data set) that was initially utilized to pre-train the global ML model. Further, the corresponding EWC loss terms, that are determined based on the various Fisher information matrices, penalizes deviations from the current global weights. This effectively "slows down" the updating of the global weights during centralized learning such that catastrophic forgetting of the global ML model is mitigated and/or eliminated. Put another way, the global ML model is not overfit to information learned from the server data that is utilized in fine-tuning the global ML model such that the global ML model forgets information learned from the client data that is utilized in initially training the global ML model.

For example, assume that the global ML model corresponds to a global automatic speech recognition (ASR) model that is initially trained in a decentralized manner based on corresponding audio data being processed locally at client devices that participate in the decentralized learning of the global ASR model. In this example, the Fisher information matrices are determined based on global weights of the global ASR model and the corresponding audio data utilized to initially train the global ASR model or additional corresponding audio data. The remote system processor(s) can combine the Fisher information matrices received from each of the client devices to determine an aggregated Fisher information matrix. Further, the remote system processor(s) can determine the corresponding EWC loss terms for each of the global weights of the global ML model based on the aggregated Fisher information matrix. For instance, a first diagonal element of the aggregated Fisher information matrix (e.g., row 1, column 1) can be a first EWC loss term for a first weight of the global weights, a second diagonal element of the aggregated Fisher information matrix (e.g., row 2, column 2) can be a second EWC loss term for a second weight of the global weights, and so on for each of the global weights of the global ML model. Additional or alternative values or combinations of values may be utilized in determining the corresponding EWC loss terms, such that a given EWC loss term may be utilized in updating multiple of the global weights and/or multiple corresponding EWC loss terms may be utilized in updating a single one of the global weights, but that these implementations may not be as computationally efficient. Accordingly, when the remote system processor(s) process, using the global ASR model, corresponding audio data that is accessible by the remote system, not only is a loss that is generated a function of the processing using the global ASR model (e.g., determined using a supervised, semi-supervised, or unsupervised learning technique), but the loss is also a function of the corresponding EWC loss terms for each of the global weights of the global ASR model.

In various implementations, the remote system processor(s) can continue generating additional server updates for the global ML model and continue updating the global weights of the global ML model for n iterations (e.g., where n is a positive integer) and using the same corresponding EWC loss terms. In some versions of those implementations, and subsequent to the n iterations, the remote system processor(s) can determine whether one or more conditions are satisfied for causing the global ML model to be deployed. The one or more conditions can include, for example, whether a threshold quantity of server updates have been utilized in updating the further updated global ML model, whether a threshold duration of time has elapsed since the further updated global ML model was updated, whether performance of the further updated global ML model satisfies a threshold performance measure, and/or other conditions. In response to determining that the one or more conditions are satisfied, the remote system processor(s) can cause the global ML model to be deployed. However, in response to determining that the one or more conditions are not satisfied, the remote system processor(s) can initiate another iteration.

For example, the client device processor(s) of the client device (or an additional client device) can receive updated global weights of the updated global ML model from the remote system, obtain an additional client device data set that is accessible at the client device (or the additional client device) and that is not accessible by the remote system, determine an updated Fisher information matrix for the additional client data set based on the updated global weights of the updated global ML model, and transmit the updated Fisher information matrix for the additional client data set to the remote system. Further, remote system processor(s) of the remote system can determine an updated corresponding EWC loss term for each of the updated global weights based on the updated Fisher information matrix received from the client device (or the additional client device) and based on additional updated Fisher information matrices received from corresponding further additional client devices. Moreover, the remote system processor(s) can continue generating further additional server updates for the updated global ML model and continue updating the updated global weights of the updated global ML model for m iterations (e.g., where m is a positive integer) and using the same corresponding updated EWC loss terms.

The above description is provided as an overview of some implementations of the present disclosure. Further description of those implementations, and other implementations, are described in more detail below.

DETAILED DESCRIPTION

Figure 1:
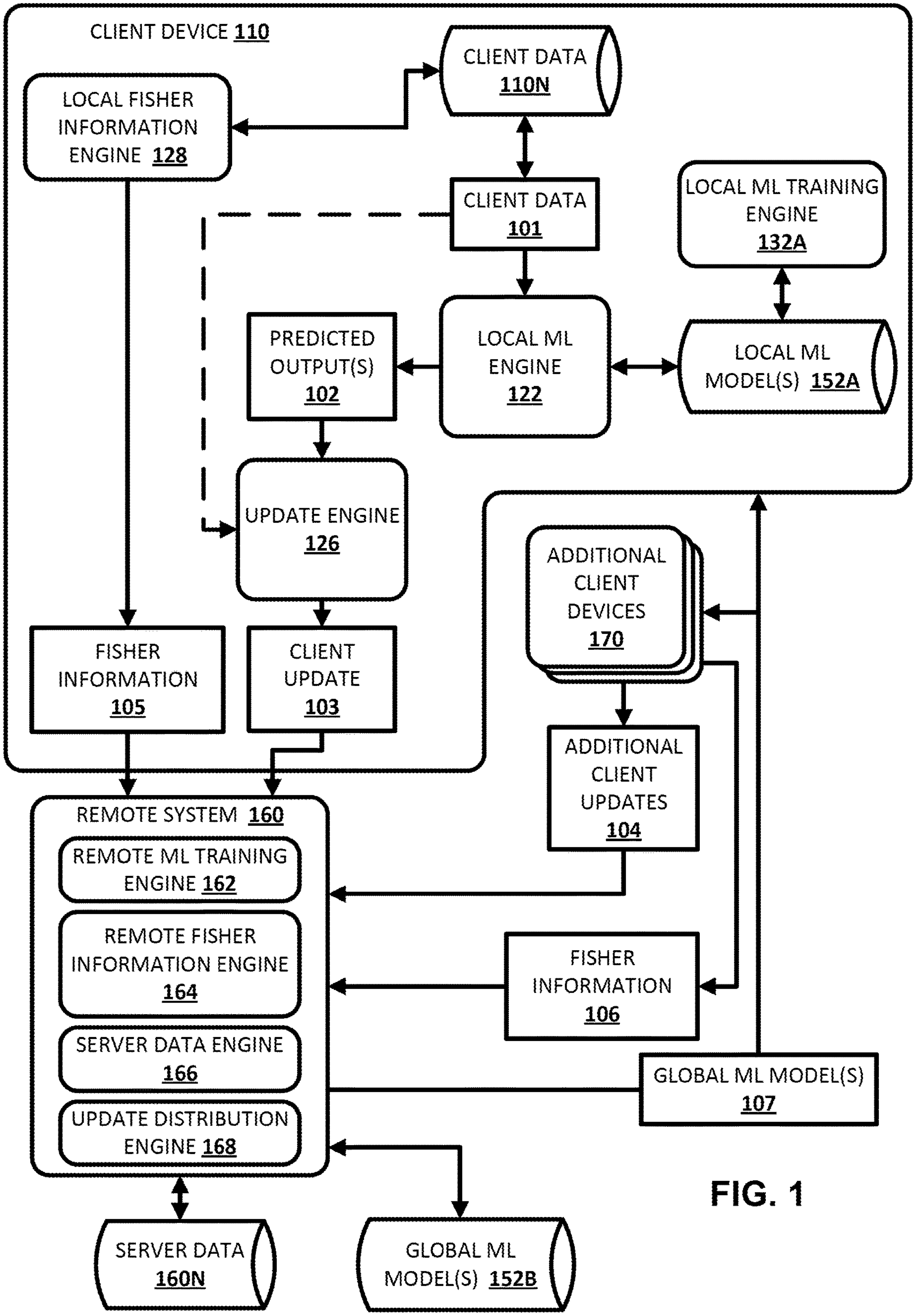
FIG. 1 depicts an example process flow that demonstrates various aspects of the present disclosure, in accordance with various implementations.

FIG. 1 depicts an example process flow that demonstrates various aspects of the present disclosure. A client device 110 is illustrated in FIG. 1, and includes the components that are encompassed within the box of FIG. 1 that represents the client device 110. Local ML engine 122 can process client data 101, using local machine learning (ML) model(s), to generate predicted output(s) 102. The client data 101 can be, for example, audio data that captures a spoken utterance and/or other noise that is generated by one or more microphones of the client device 110, vision data that captures an environment of the client device 110 (e.g., a user of the client device 110, including hand gesture(s) and/or movement(s), body gesture(s) and/or body movement(s), eye gaze, facial movement, mouth movement, etc.) that is generated via one or more vision components of the client device 110, textual data generated via one or more interfaces of the client device (e.g., a touchscreen, a keyboard, etc.), and/or other client data. In some implementations, the client data 101 may be obtained as it is generated by one or more respective sensor components. In additional or alternative implementations, the client data 101 may be previously generated and obtained from on-device storage of the client device 110 (e.g., from client data database 110N), but the client data 101 may not be accessible by the remote system 160.

The local ML model(s) can include, for example, one or more local ML models that are stored in on-device memory of the client device (e.g., local ML model(s) database 152A), and that are local counterparts of corresponding global ML model(s) received from a remote system 160 (e.g., a high-performance remote server or cluster of high-performance remote servers). Notably, the global ML model(s) may be initially trained from scratch in a decentralized manner (e.g., using the client device 110, additional client devices 170 (e.g., additional instances of the client device 110), and/or other client devices) and based on corresponding client device (e.g., from corresponding instances of the client data database 110N).

During an initial pre-training stage, the remote system 160 can identify an untrained global ML model, and transmit the untrained global ML model (or global weights of the untrained global ML model) to client devices 110, 170 (e.g., as indicated by 107) that are participating in a given round of decentralized learning of the global ML model. These client devices 110, 170 may store the untrained global ML model in corresponding on-device storage as the local ML models to cause the untrained global ML model to be trained based on a client data set and in a decentralized manner as described herein. These ML models can include, for example, various audio-based ML models that are utilized to process audio data generated locally at the client devices 110, 170, various vision-based ML models that are utilized to process vision data generated locally at the client devices 110, 170, various text-based ML models that are utilized to process textual data generated locally at the client devices 110, 170, and/or any other ML model that may be trained in the decentralized manner as described herein (e.g., the various ML models described with respect to FIG. 2 and/or other ML model(s)).

For example, assume that an untrained global ML model corresponding to an untrained global hotword detection model is received at the client device 110 and from the remote system 160. In this example, the client device 110 may store the untrained global hotword detection model in the local ML model(s) database 152A as a local hotword detection model that is a local counterpart (e.g., local to the client device 110) of the untrained global hotword detection model. Further, the client device 110 can process audio data (e.g., as the client data 101), using the local hotword detection model, to generate a prediction of whether the audio data captures a particular word or phrase (e.g., "Assistant", "Hey Assistant", etc.) that, when detected, causes an automated assistant executing at least in part at the client device to be invoked as the predicted output(s) 102. The prediction of whether the audio data captures the particular word or phrase can include a binary value of whether the audio data is predicted to include the particular word or phrase, a probability or log likelihood that of whether the audio data is predicted to include the particular word or phrase, and/or other value(s) and/or measure(s).

As another example, assume that an untrained global ML model corresponding to an untrained global hotword free invocation model is received at the client device 110 and from the remote system 160. In this example, the client device 110 may store the unstrained global hotword free invocation model in the local ML model(s) database 152A as a local hotword detection model that is a local counterpart (e.g., local to the client device 110) of the untrained global hotword detection model. Further, the client device 110 can process vision data (e.g., as the client data 101), using the local hotword free invocation model, to generate a prediction of whether the vision data captures a particular physical gesture or movement (e.g., lip movement, eye gaze, etc.) that, when detected, causes the automated assistant executing at least in part at the client device to be invoked as the predicted output(s) 102. The prediction of whether the vision data captures the particular physical gesture or movement can include a binary value of whether the vision data is predicted to include the particular physical gesture or movement, a probability or log likelihood that of whether the vision data is predicted to include the particular physical gesture or movement, and/or other value(s) and/or measure (s).

In some implementations, update engine 126 can process at least the predicted output(s) 102 to generate a client update 103. In some versions of those implementations, the update engine 126 can generate the client update 103 using one or more supervised learning techniques (e.g., as indicated by the dashed line from the client data 101 to the update engine 126). For example, again assume that the global ML model corresponding to the global hotword detection model is received at the client device 110. Further assume that the client data 101 corresponds to audio data previously generated by microphone(s) of the client device 110 (e.g., where the client data is obtained from the client data database 110N). In this example, the client device 110 may also have stored an indication of whether the audio data does, in fact, include a particular word or phrase that invoked the automated assistant, and the update engine 126 may utilize the stored indication as a supervision signal that may be utilized in generating the client update 103.

For instance, assume that a user engaged in a dialog session with the automated assistant subsequent to providing a spoken utterance that is captured in the audio data. In this instance, the user engaging in the dialog session with the automated assistant may cause the client device 110 to generate and store an indication that the audio data does, in fact, include the particular word or phrase that invokes the automated assistant. Accordingly, the update engine 126 can compare the predicted output(s) 102 (e.g., the predicted value of whether the audio data captures the particular word or phrase) to the stored indication (e.g., a ground truth output, such as a value of 1 indicating that the audio data does, in fact, include the particular word or phrase that invokes the automated assistant) to generate the client update 103 to reinforce that the audio data does include the particular word or phrase. In contrast, assume that the user did not engage in the dialog session with the automated assistant subsequent to providing the spoken utterance that is captured in the audio data. In this instance, the user not engaging in the dialog session with the automated assistant may cause the client device 110 to generate and store an indication that the audio data does not, in fact, include the particular word or phrase. Accordingly, the update engine 126 can compare the predicted output(s) 102 (e.g., the predicted value of whether the audio data captures the particular word or phrase) to the stored indication (e.g., a ground truth output, such as a value of 0 indicating that the audio data does not, in fact, include the particular word or phrase that invokes the automated assistant) to generate the client update 103 to reinforce that the audio data does not include the particular word or phrase. In these instances, the client update 103 may be a gradient, such as a zero gradient (e.g., when the predicted output(s) 102 match the supervision signal) or non-zero gradient (e.g., based on extent of mismatching between the predicted output(s) 102 and the supervision signal and made based on a deterministic comparison therebetween).

In additional or alternative implementations, the update engine 126 can generate the client update 103 using one or more unsupervised or semi-supervised learning techniques. For example, again assume that the global ML model corresponding to the global hotword detection model is received at the client device 110. Further assume that the client data 101 corresponds to audio data previously generated by microphone(s) of the client device 110 (e.g., where the client data is obtained from the client data database 110N). In this example, the client device 110 may not have access to any stored indication of whether the audio data does, in fact, include a particular word or phrase that invoked the automated assistant. Accordingly, the update engine 126 may not have access to an explicit supervision signal for generating the client update 103. Nonetheless, the update engine 126 may utilize various unsupervised or semi-supervised learning techniques to generate the client update 103 even without the explicit supervision signal. These unsupervised or semi-supervised learning techniques can include, for example, a teacher-student technique, a knowledge distillation technique, and/or other unsupervised or semi-supervised learning techniques.

For instance, the client device 110 may process, using a benchmark hotword model (e.g., stored in the local ML model(s) database 152A), the audio data to generate benchmark output(s) indicative of whether the audio data captures a particular word or phrase (e.g., "Assistant", "Hey Assistant", etc.) that, when detected, causes an automated assistant executing at least in part at the client device to be invoked. In these and other instances, the benchmark hotword model may be the local hotword detection model utilized to generate the predicted output(s) 102 and/or another, distinct hotword detection model stored locally at the client device 110 (e.g., an existing hotword model that is deployed for inference at the client device 110). Further, the update engine 126 may compare the predicted output(s) 102 and the benchmark output(s) to generate the client update 103 in this semi-supervised teacher-student technique. Although the above example of semi-supervised learning, it should be understood that is provided as one non-limiting example of semi-supervised learning and is not meant to be limiting. Moreover, although the above examples are described with respect to hotword detection models, it should be understood that is also for the sake of example and is not meant to be limiting.

In various implementations, remote ML training engine 162 of the remote system can utilize the client update 103 received from the client device 110 and additional client updates 104 received from the additional client devices 170 (e.g., that are generated in the same or similar manner described with respect to generating the client update 103) in updating the untrained global ML model. In some versions of those implementations, the client updates 103, 104 may be a gradient, such as a zero gradient (e.g., when the predicted output(s) 102 match the supervision signal) or non-zero gradient (e.g., based on extent of mismatching between the predicted output(s) 102 and the supervision signal and made based on a deterministic comparison therebetween). In these implementations, the remote ML training engine 162 can update the untrained global ML model based on the gradients received from the client devices 110, 170. In additional or alternative versions of those implementations, local ML training engine 132A may update the global ML model(s) 105 locally at the client device 110 and based on the client update 103. In these implementations, the client device 110 may transmit one or more updated weights of the untrained global ML model to the remote system 160 in lieu of the client update 103 itself. In these implementations, the remote ML training engine 162 can replace the global weights of the untrained global ML model with those received from the client devices 110, 170 (e.g., replace the global weights with an average of the updated weights received from the client devices 110, 170).

Notably, the remote system 160 can initiate subsequent rounds of decentralized learning to continue updating the global ML model in the same or similar manner until one or more conditions are satisfied. The one or more conditions can include, for example, whether a threshold quantity of client updates 103, 104 have been utilized in updating the global ML model, whether a threshold duration of time has elapsed since the given round of decentralized learning was initiated, whether performance of the global ML model satisfies a threshold performance measure, whether a threshold quantity of rounds of decentralized learning have been performed, and/or other conditions. Subsequent to the initial pre-training stage, the remote system 160 can perform a fine-tuning stage in a decentralized manner. However, in the fine-tuning stage, the client devices 110, 170 do not generate client updates that are then aggregated at the remote system 160 for utilization in further updating the global ML model.

Rather, the remote system 160 transmits the most recently updated global ML model (or the global weights thereof) to the client devices 110, 170 (e.g., as indicated by 107), and the client devices 110, 170 are utilized to determine Fisher information 105, 106 for corresponding client device data sets (e.g., the same client data that was utilized during the pre-training of the global ML model or similar client data) and based on the global weights of the most recently updated global ML model via a local Fisher information engine 128. The Fisher information 105, 106 can be aggregated at the remote system 160 via remote Fisher information engine 164, and the remote Fisher information engine 164 can determine corresponding elastic weight consolidation (EWC) loss terms for each of the global weights of the global ML model.

The corresponding EWC loss terms may add a corresponding loss penalty that slows down learning of the corresponding global weights of the global ML model during the fine-tuning of the global ML model based on server data (e.g., obtained from server data database 160N). Put another way, the corresponding EWC loss terms ensure that the corresponding global weights of the global ML model that were originally learned based on the client data are not overfit to the server data when the global ML model is subsequently fine-tuned based on the server data, thereby mitigating and/or eliminating catastrophic forgetting.

Notably, the Fisher information 105, 106 determined by respective instances of the local Fisher information engine 128 seeks to measure the amount of information that an observable random variable carries about an unknown parameter of a distribution, and the Fisher information matrix may be computed as an expectation value of this measure as indicated below by Equation 1:

$$F(w) = E\left[\left(\frac{\partial}{\partial w} L(X; w)\right)^2 \mid w\right] \quad \text{(Equation 1)}$$

where the Fisher information is defined as the variance of the partial derivative with respect to the parameters w of the loss, and where $$g(X; w) = \frac{\partial}{\partial w} L(X; w)$$

is a gradient derived from the loss function L (X;w). Put another way, the Fisher information may be computed as an expectation value of the square of the gradient. Further, the Fisher information may be represented in matrix form (e.g., a Hessian matrix). Moreover, the remote Fisher information engine 164 can combine the Fisher information 105, 106 received from the client devices 110, 170 by, for example, by averaging all of the Fisher information matrices.

In some implementations, the remote Fisher information engine 164 may determine the corresponding EWC loss terms based on a diagonal of the Fisher information matrix. In some versions of these implementations, the remote system 160 may utilize each corresponding value of the diagonal of the Fisher information matrix as a corresponding EWC loss term for a corresponding one of the global weights of the global ML model. In additional or alternative versions of these implementations, additional or alternative values or combinations of values may be utilized in determining the EWC loss terms, such that a given EWC loss term may be utilized in updating multiple global weights of the global weights and/or multiple EWC loss terms may be utilized in updating a given global weight of the global weights, but that these implementations may not be as computationally efficient.

In these implementations, server data engine 166 may obtain server data (e.g., from the server data database 160N). Further, the remote ML training engine 162 can process, using the global ML model, the server data to generate predicted output(s), and generate a server update based on the predicted output(s) (e.g., in the same or similar manner described above with respect to generating the client update 110). However, the remote ML training engine 162 can further generate the server update as a function of the corresponding EWC loss terms. For example, the remote ML training engine 162 may generate the server update using supervised, semi-supervised, or unsupervised learning techniques as described above. However, in these implementations, the remote ML training engine 162 may augment the server update using the EWC loss terms as indicated below by Equation 2:

$$L(w) = L_B(w) + \frac{1}{2}\lambda\Sigma_i F_i(w_i - w_{A,i})^2 \quad \text{(Equation 2)}$$

where $W_A$ corresponds to one or more corresponding global weights of the global ML model, where F corresponds to the Fisher information, where i is an index over the parameters w of the loss, where $L_B$ (w) corresponds to the server update determined based on at least the predicted output(s), and where λ is a tunable parameter that sets the strength of regularization. Put another way, the remote ML training engine 162 may determine the server update as a sum of, for instance, a gradient determined based on at least the predicted output(s) and the corresponding EWC loss terms. Although Equation 2 described the server update as a sum, it should be understood that is for the sake of example and other weighted or non-weighted combinations of this data may be utilized in generating the server update.

Notably, the remote system 160 can utilize the corresponding EWC loss terms for n iterations (i.e., where n is a positive integer) to continue to generate additional server updates and update the global ML model based on the additional server updates. Subsequent to the n additional iterations being performed, the remote system 160 can determine whether one or more conditions are satisfied for causing the updated global ML model to be deployed. The one or more conditions can include, for example, whether a threshold quantity of server updates have been utilized in updating the updated global ML model, whether a threshold duration of time has elapsed since the updated global ML model was updated, whether performance of the updated global ML model satisfies a threshold performance measure, and/or other conditions. If the one or more conditions are satisfied, then update distribution engine 168 can cause the updated global ML model to be deployed by the remote system 160, the client devices 110, 170, and/or additional client devices.

However, if the one or more conditions are not satisfied, then the remote system 160 can transmit the updated global ML model (or the updated global weights of the updated global ML model) to the client devices 110, 170 and/or additional client devices. The client devices 110, 170 and/or additional client devices can determine updated Fisher information based on an additional client data set and for the updated global weights. Further, the client devices 110, 170 and/or additional client devices can transmit the updated Fisher information back to the remote system 160, and the remote Fisher information engine 164 can determine updated corresponding EWC loss terms for each of the updated global weights of the updated global ML model. Moreover, the remote system 160 can utilize the updated corresponding EWC loss terms for m iterations (i.e., where m is a positive integer) to continue to generate further additional server updates and update the updated global ML model based on the further additional server updates. This process can be repeated until the one or more conditions are satisfied for causing the further updated global ML model to be deployed.

Figure 2:
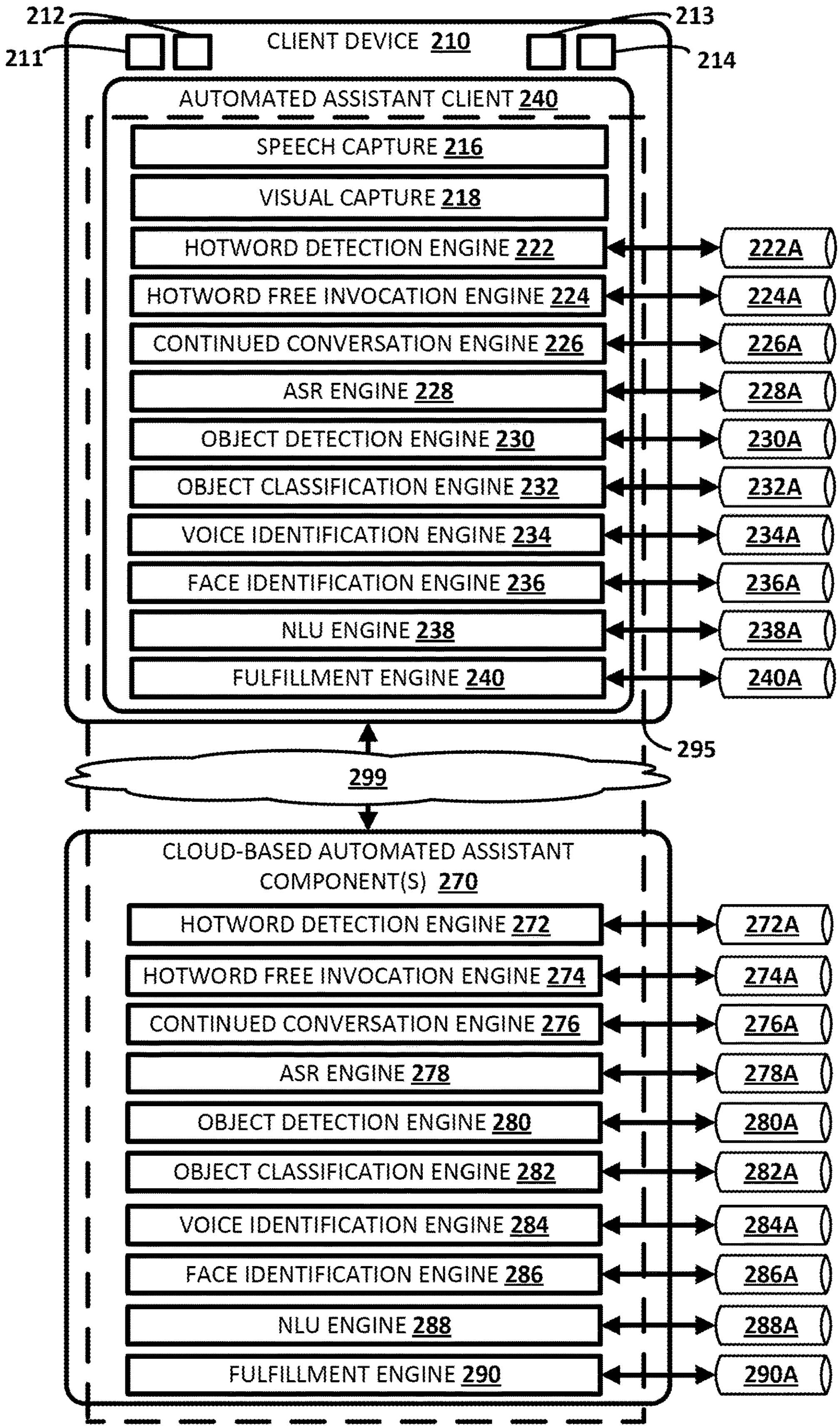
FIG. 2 depicts a block diagram that demonstrates various aspects of the present disclosure, and in which implementations disclosed herein may be implemented.

Turning now to FIG. 2, a block diagram that demonstrates various aspects of the present is depicted. The block diagram of FIG. 2 includes a client device 210 having various on-device machine learning (ML) engines, that utilize various ML models that may be trained in the manner described herein, and that are included as part of (or in communication with) an automated assistant client 240. Other components of the client device 210 are not illustrated in FIG. 2 for simplicity. FIG. 2 illustrates one example of how the various on-device ML engines of and the respective ML models may be utilized by the automated assistant client 240 in performing various actions.

The client device 210 in FIG. 2 is illustrated with one or more microphones 211 for generating audio data, one or more speakers 212 for rendering audio data, one or more vision components 213 for generating vision data, and display(s) 214 (e.g., a touch-sensitive display) for rendering visual data and/or for receiving various touch and/or typed inputs. The client device 210 may further include pressure sensor(s), proximity sensor(s), accelerometer(s), magnetometer(s), and/or other sensor(s) that are used to generate other sensor data. The client device 210 at least selectively executes the automated assistant client 240. The automated assistant client 240 includes, in the example of FIG. 2, hotword detection engine 222, hotword free invocation engine 224, continued conversation engine 226, automatic speech recognition (ASR) engine 228, object detection engine 230, object classification engine 232, voice identification engine 234, and face identification engine 236. The automated assistant client 240 further includes speech capture engine 216 and visual capture engine 218. It should be understood that the ML engines and ML models depicted in FIG. 2 are provided for the sake of example to illustrate various ML models that may be trained in the manner described herein, and are not meant to be limiting. For example, the automated assistant client 240 can further include additional and/or alternative engines, such as a text-to-speech (TTS) engine and a respective TTS model, a voice activity detection (VAD) engine and a respective VAD model, an endpoint detector engine and a respective endpoint detector model, a lip movement engine and a respective lip movement model, and/or other engine(s) along with respective ML model(s). Moreover, it should be understood that one or more of the engines and/or models described herein can be combined, such that a single engine and/or model can perform the functions of multiple engines and/or models described herein.

One or more cloud-based automated assistant components 270 can optionally be implemented on one or more computing systems (collectively referred to as a "cloud" computing system) that are communicatively coupled to client device 210 via one or more networks as indicated generally by 299. The cloud-based automated assistant components 270 can be implemented, for example, via a high-performance remote server or a cluster of high-performance remote servers. In various implementations, an instance of the automated assistant client 240, by way of its interactions with one or more of the cloud-based automated assistant components 270, may form what appears to be, from a user's perspective, a logical instance of an automated assistant as indicated generally by 295 with which the user may engage in a human-to-computer interactions (e.g., voice-based interactions, gesture-based interactions, text-based interactions, and/or touch-based interactions). The one or more cloud-based automated assistant components 270 include, in the example of FIG. 2, cloud-based counterparts of the ML engines of the client device 210 described above, such as hotword detection engine 272, hotword free invocation engine 274, continued conversation engine 276, ASR engine 278, object detection engine 280, object classification engine 282, voice identification engine 284, and face identification engine 286. Again, it should be understood that the ML engines and ML models depicted in FIG. 2 are provided for the sake of example to illustrate various ML models that may be trained in the manner described herein, and are not meant to be limiting.

The client device 210 can be, for example: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker, a smart appliance such as a smart television (or a standard television equipped with a networked dongle with automated assistant capabilities), and/or a wearable apparatus of the user that includes a computing device (e.g., a watch of the user having a computing device, glasses of the user having a computing device, a virtual or augmented reality computing device). Additional and/or alternative client devices may be provided.

The one or more vision components 213 can take various forms, such as monographic cameras, stereographic cameras, a LIDAR component (or other laser-based component(s)), a radar component, etc. The one or more vision components 213 may be used, e.g., by the visual capture engine 218, to capture vision data corresponding to vision frames (e.g., image frames, video frames, laser-based vision frames, etc.) of an environment in which the client device 210 is deployed. In some implementations, such vision frames can be utilized to determine whether a user is present near the client device 210 and/or a distance of a given user of the client device 210 relative to the client device 210. Such determination of user presence can be utilized, for example, in determining whether to activate one or more of the various on-device ML engines depicted in FIG. 2, and/or other engine(s). Further, the speech capture engine 216 can be configured to capture a user's spoken utterance(s) and/or other audio data captured via the one or more of the microphones 211, and optionally in response to receiving a particular input to invoke the automated assistant 295 (e.g., via actuation of a hardware or software button of the client device 210, via a particular word or phrase, via a particular gesture, etc.).

As described herein, such audio data, vision data, textual data, and/or other data (collectively referred to herein as "client data") can be processed by one or more of the various engines depicted in FIG. 2 to generate predicted output at the client device 210 using corresponding ML models and/or at one or more of the cloud-based automated assistant components 270 using corresponding ML models. Notably, the predicted output generated using the corresponding ML models may vary based on the client data (e.g., whether the client data is audio data, vision data, textual data, and/or other sensor data) and/or the corresponding ML models utilized in processing the client data.

As some non-limiting example, the respective hotword detection engines 222, 272 can utilize respective hotword detection models 222A, 272A to predict whether audio data includes one or more particular words or phrases to invoke the automated assistant 295 (e.g., "Ok Assistant", "Hey Assistant", "What is the weather Assistant?", etc.) or certain functions of the automated assistant 295 (e.g., "Stop" to stop an alarm sounding or music playing or the like); the respective hotword free invocation engines 224, 274 can utilize respective hotword free invocation models 224A, 274A to predict whether vision data includes a physical motion gesture or other signal to invoke the automated assistant 295 (e.g., based on a gaze of the user and optionally further based on mouth movement of the user); the respective continued conversation engines 226, 276 can utilize respective continued conversation models 226A, 276A to predict whether further audio data is directed to the automated assistant 295 (e.g., or directed to an additional user in the environment of the client device 210); the respective ASR engines 228, 278 can utilize respective ASR models 228A, 278A to generate recognized text, or predict phoneme(s) and/or token(s) that correspond to audio data detected at the client device 210 and generate the recognized text based on the phoneme(s) and/or token(s); the respective object detection engines 230, 280 can utilize respective object detection models 230A, 280A to predict object location(s) included in vision data captured at the client device 210; the respective object classification engines 232, 282 can utilize respective object classification models 232A, 282A to predict object classification(s) of object(s) included in vision data captured at the client device 210; the respective voice identification engines 234, 284 can utilize respective voice identification models 234A, 284A to predict whether audio data captures a spoken utterance of one or more known users of the client device 210 (e.g., by generating a speaker embedding, or other representation, that can be compared to a corresponding actual embedding for the one or more known users of the client device 210); and the respective face identification engines 236, 286 can utilize respective face identification models 236A, 286A to predict whether vision data captures one or more known users of the client device 210 in an environment of the client device 210 (e.g., by generating a face embedding, or other representation, that can be compared to a corresponding face embedding for the one or more known users of the client device 210).

In some implementations, the client device 210 and one or more of the cloud-based automated assistant components 270 may further include natural language understanding (NLU) engines 238, 288 and fulfillment engines 240, 290, respectively. The NLU engines 238, 288 may perform natural language understanding and/or natural language processing utilizing respective NLU models 238A, 288A, on recognized text, predicted phoneme(s), and/or predicted token(s) generated by the ASR engines 228, 278 to generate NLU data. The NLU data can include, for example, intent(s) for a spoken utterance captured in audio data, and optionally slot value(s) for parameter(s) for the intent(s). Further, the fulfillment engines 240, 290 can generate fulfillment data utilizing respective fulfillment models or rules 240A, 290A, and based on processing the NLU data. The fulfillment data can, for example, define certain fulfillment that is responsive to user input (e.g., spoken utterances, typed input, touch input, gesture input, and/or any other user input) provided by a user of the client device 210. The certain fulfillment can include causing the automated assistant 295 to interact with software application(s) accessible at the client device 210, causing the automated assistant 295 to transmit command(s) to Internet-of-things (IoT) device(s) (directly or via corresponding remote system(s)) based on the user input, and/or other resolution action(s) to be performed based on processing the user input. The fulfillment data is then provided for local and/or remote performance/execution of the determined action(s) to cause the certain fulfillment to be performed.

In other implementations, the NLU engines 238, 288 and the fulfillment engines 240, 290 may be omitted. In some versions of these implementations, the ASR engines 228, 278 can generate the fulfillment data directly based on the user input. For example, assume the ASR engines 228, 278 processes, using the respective ASR model 228A, 278A, a spoken utterance of "turn on the lights." In this example, the ASR engines 228, 278 can generate a semantic output that is then transmitted to a software application associated with the lights and/or directly to the lights that indicates that they should be turned on without actively using the NLU engines 238, 288 and/or the fulfillment engines 240, 290 in processing the spoken utterance. In other versions of these implementations, the NLU engines 238, 288 and the fulfillment engines 240, 290 can be replaced by respective large language model (LLM) engines that utilize respective LLMs in place of the NLU engines 238, 288 and the fulfillment engines 240, 290.

Notably, the one or more cloud-based automated assistant components 270 include cloud-based counterparts to the engines and models described herein with respect to the client device 210 of FIG. 2. However, in some implementations, these engines and models of the one or more cloud-based automated assistant components 270 may not be utilized since these engines and models may be transmitted directly to the client device 210 and executed locally at the client device 210. In other implementations, these engines and models may be utilized exclusively when the client device 210 detects any user input and transmits the user input to the one or more cloud-based automated assistant components 270. In various implementations, these engines and models executed at the client device 210 and the one or more cloud-based automated assistant components 270 may be utilized in conjunction with one another in a distributed manner. In these implementations, a remote execution module can optionally be included to perform remote execution using one or more of these engines and models based on local or remotely generated NLU data and/or fulfillment data. Additional and/or alternative remote engines can be included.

As described herein, in various implementations on-device speech processing, on-device image processing, on-device NLU, on-device fulfillment, and/or on-device execution can be prioritized at least due to the latency and/or network usage reductions they provide when resolving a spoken utterance (due to no client-server roundtrip(s) being needed to resolve the spoken utterance). However, one or more of the cloud-based automated assistant components 270 can be utilized at least selectively. For example, such component(s) can be utilized in parallel with on-device component(s) and output from such component(s) utilized when local component(s) fail. For example, if any of the on-device engines and/or models fail (e.g., due to relatively limited resources of client device 210), then the more robust resources of the cloud may be utilized.

Figure 3:
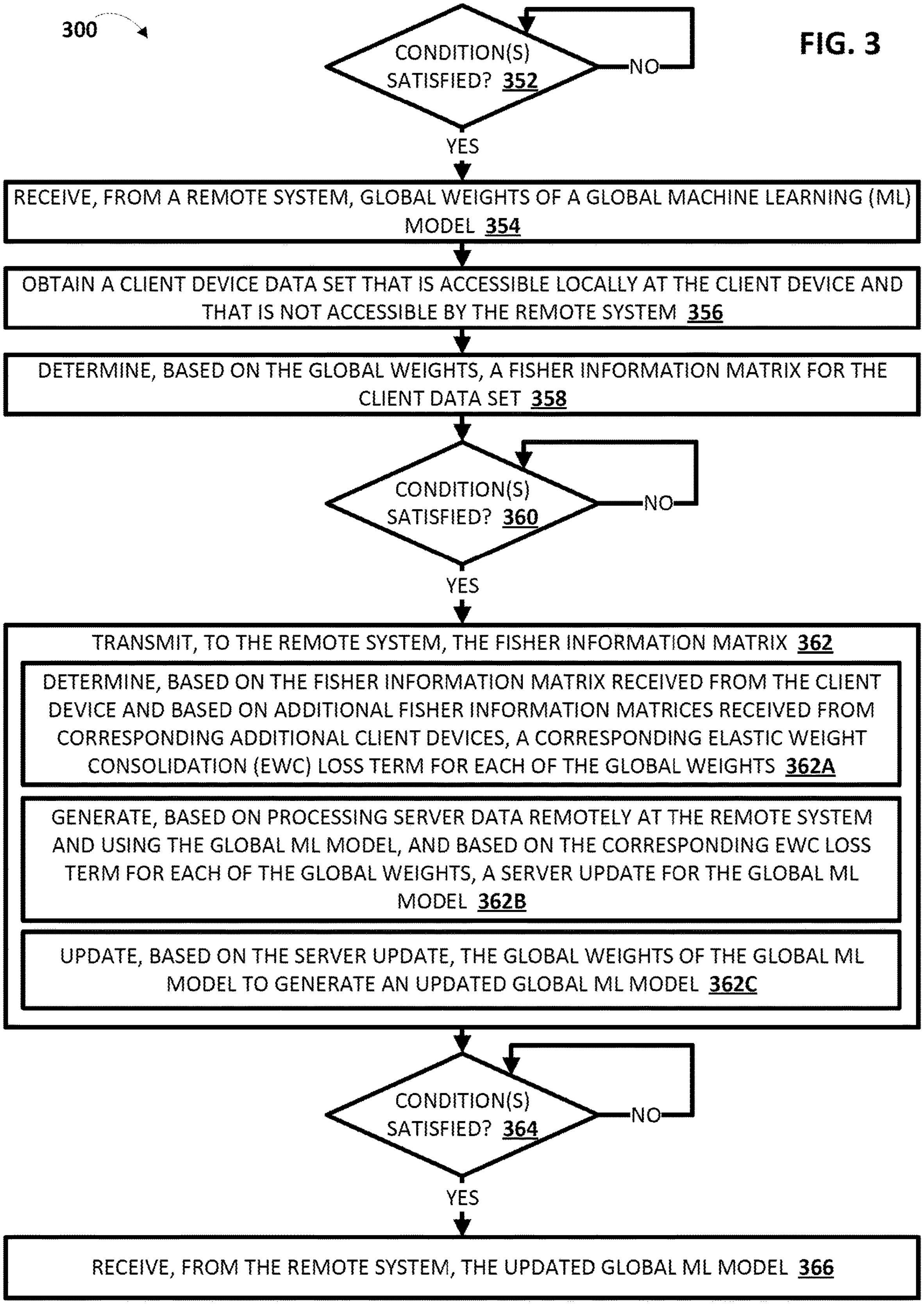
FIG. 3 depicts a flowchart illustrating an example method of client-side aspects for utilizing elastic weight consolidation (EWC) loss terms in updating a global machine learning (ML) model, in accordance with various implementations.

Turning now to FIG. 3, a flowchart illustrating an example method 300 of client-side aspects for utilizing elastic weight consolidation (EWC) loss terms in updating a global machine learning (ML) model is depicted. For convenience, the operations of the method 300 are described with reference to a system that performs the operations. The system of method 300 includes one or more processors and/or other component(s) of a computing device (e.g., the client device 110 of FIG. 1, the client device 210 of FIG. 2, computing device 510 of FIG. 5, and/or other client devices). Moreover, while operations of the method 300 are shown in a particular order, this is not meant to be limiting. One or more operations may be reordered, omitted, or added.

At block 352, the system determines whether one or more conditions are satisfied. The one or more conditions can include, for example, whether a client device has checked-in to a population of client devices that will be utilized in the given round of decentralized learning of a global ML model, whether it is a particular time of day, whether it is a particular day of week, whether the client device is charging, whether the client device has a threshold state of charge, whether the client device is being actively utilized by a user of the client device, and/or other conditions. Put another way, the one or more conditions can indicate whether the client device is ready to receive a global ML model. If, at an iteration of block 352, the system determines that the one or more conditions are not satisfied, then the system continues monitoring for satisfaction of the one or more conditions at block 352. If, at an iteration of block 352, the system determines that the one or more conditions are satisfied, then the system proceeds to block 354.

At block 354, the system receives, from a remote system, global weights of a global machine learning (ML) model. The system can cause the global weights of the global ML model to be stored in on-device storage of the client device. In implementations where the client device already has an on-device counterpart of the global ML model stored in the on-device storage of the client device, the system can cause weights of the on-device counterpart of the global ML model to be replaced with the global weights of the global ML model that are received.

At block 356, the system obtains a client device data set that is accessible locally at the client device and that is not accessible by the remote system. The client data set that is obtained by the system can be based on a type of the global ML model that is being updated in the manner described herein. For example, if the global ML model is an audio-based ML model that is being trained to process audio data (e.g., a hotword detection model, an ASR model, etc.), then the client device data set can include audio data that is accessible locally at the client device and that is not accessible by the remote system. As another example, if the global ML model is a vision-based ML model that is being trained to process vision data (e.g., a hotword free invocation model, an object classification model, etc.), then the client device data set can include vision data that is accessible locally at the client device and that is not accessible by the remote system. As yet another example, if the global ML model is a text-based ML model that is being trained to process audio data (e.g., a NLU model, a LLM, etc.), then the client device data set can include textual data that is accessible locally at the client device and that is not accessible by the remote system.

At block 358, the system determines, based on the global weights, a Fisher information matrix for the client data set. The system can determine the Fisher information matrix for the client data set in the same or similar manner described with respect to FIG. 1 (e.g., with respect to the remote local Fisher information engine 128).

At block 360, the system determines whether one or more conditions are satisfied. The one or more conditions can include, for example, the one or more conditions described above with respect to block 352. Put another way, the one or more conditions can indicate whether the client device is ready to transmit the Fisher information matrix back to the remote system. If, at an iteration of block 360, the system determines that the one or more conditions are not satisfied, then the system continues monitoring for satisfaction of the one or more conditions at block 360. Additionally, or alternatively, the system can return to block 356 to obtain an additional client device data set that is accessible locally at the client device and that is not accessible by the remote system, proceed to block 358 to determine, based on the global weights, an additional Fisher information matrix for the additional client data set, and proceed to block 360. If, at an iteration of block 360, the system determines that the one or more conditions are satisfied, then the system proceeds to block 362.

At block 362, the system transmits, to the remote system, the Fisher information matrix (or matrices). Transmitting the Fisher information matrix (or matrices) to the remote system can cause the remote system to perform various operations. For example, as indicated at sub-block 362A, transmitting the Fisher information matrix (or matrices) to the remote system can cause the remote system to determine, based on the Fisher information matrix (or matrices) received from the client device and based on additional Fisher information matrices received from corresponding additional client devices, a corresponding elastic weight consolidation (EWC) loss term for each of the global weights. Further, as indicated at sub-block 362B, transmitting the Fisher information matrix (or matrices) to the remote system can further cause the remote system to generate, based on processing server data remotely at the remote system and using the global ML model, and based on the corresponding EWC loss term for each of the global weights, a server update for the global ML model. Moreover, as indicated at sub-block 362C, transmitting the Fisher information matrix (or matrices) to the remote system can further cause the remote system to update, based on the server update, the global weights of the global ML model to generate an updated global ML model.

At block 364, the system determines whether one or more conditions are satisfied. The one or more conditions can include, for example, the one or more conditions described above with respect to block 352. Put another way, the one or more conditions can indicate whether the client device is ready to receive an updated global ML model. If, at an iteration of block 364, the system determines that the one or more conditions are not satisfied, then the system continues monitoring for satisfaction of the one or more conditions at block 364. If, at an iteration of block 364, the system determines that the one or more conditions are satisfied, then the system proceeds to block 366.

At block 366, the system receives, from the remote system, the updated global ML model. In some implementations, the client device can deploy the updated global ML model (e.g., assuming one or more conditions for deploying the updated global ML model are satisfied). In additional or alternative implementations, the client device can further determine an updated Fisher information for an additional client device data set (e.g., assuming one or more conditions for deploying the updated global ML model are not satisfied) to continue updating the updated global ML model.

Figure 4:
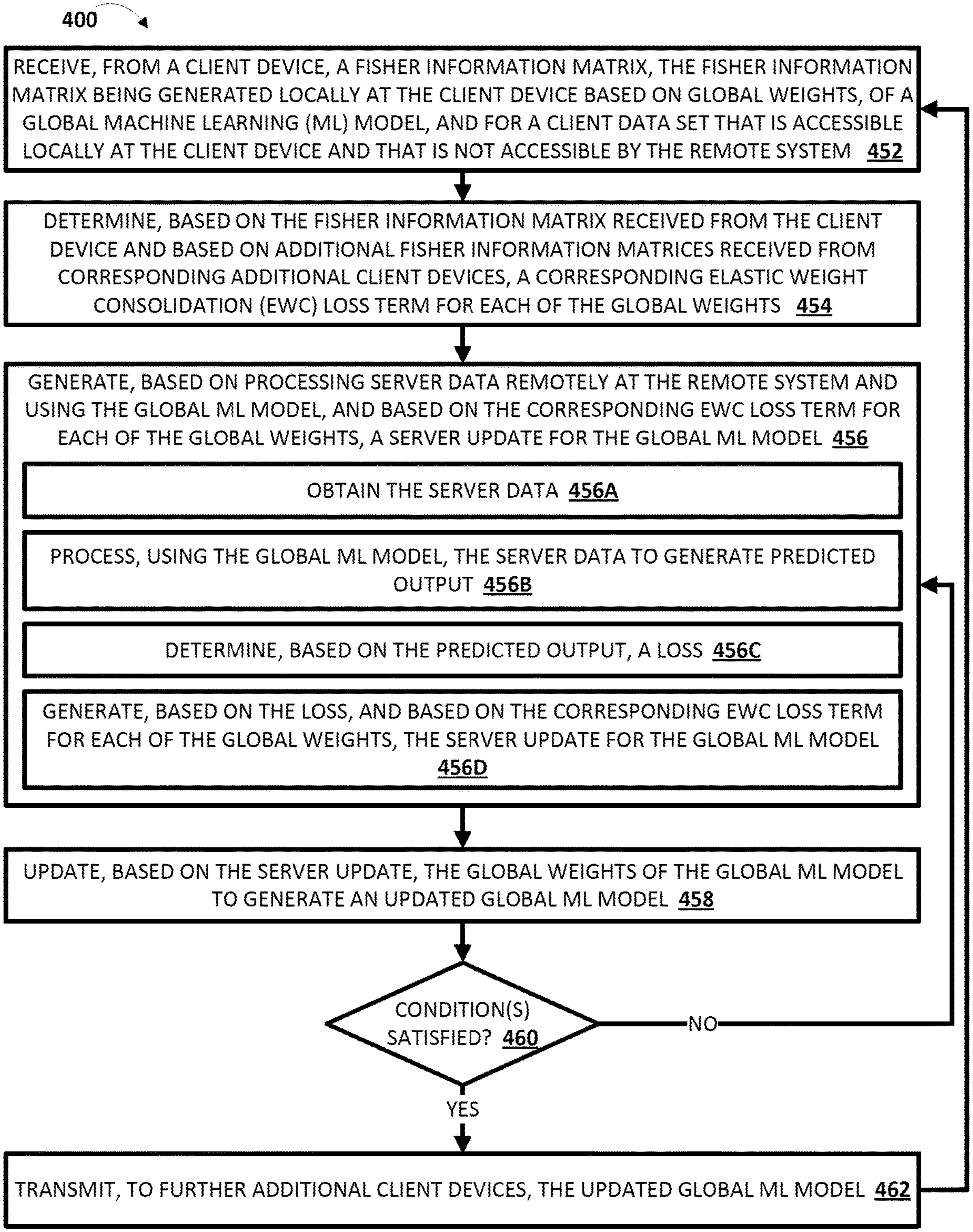
FIG. 4 depicts a flowchart illustrating an example method of server-side aspects for utilizing elastic weight consolidation (EWC) loss terms in updating a global machine learning (ML) model, in accordance with various implementations.

Turning now to FIG. 4, a flowchart illustrating an example method 400 of server-side aspects for utilizing elastic weight consolidation (EWC) loss terms in updating a global machine learning (ML) model is depicted. For convenience, the operations of the method 400 are described with reference to a system that performs the operations. The system of method 400 includes one or more processors and/or other component(s) of a computing device ((e.g., the remote system 160 of FIG. 1, the cloud-based automated assistant component(s) 270 of FIG. 2, computing device 510 of FIG. 5, and/or other computing devices). Moreover, while operations of the method 400 are shown in a particular order, this is not meant to be limiting. One or more operations may be reordered, omitted, or added.

At block 452, the system receives, from a client device, a Fisher information matrix, the Fisher information matrix being generated locally at the client device based on global weights, of a global machine learning (ML) model, and for a client device set that is accessible locally at the client device and that is not accessible by the remote system. The client device can determine the Fisher information matrix for the client data set in the same or similar manner described with respect to FIG. 1 (e.g., with respect to the remote local Fisher information engine 128).

At block 454, the system determines, based on the Fisher information matrix received from the client device and based on additional Fisher information matrices received from corresponding additional client devices, a corresponding elastic weight consolidation (EWC) loss term for each of the global weights. The system can determine the corresponding EWC loss terms in the same or similar manner described with respect to FIG. 1 (e.g., with respect to the remote Fisher information engine 164).

At block 456, the system generates, based on processing server data remotely at the remote system and using the global ML model, and based on the corresponding EWC loss term for each of the global weights, a server update for the global ML model. The system can determine the server update in the same or similar manner described with respect to FIG. 1 (e.g., with respect to the remote ML training engine 162). For example, as indicated at sub-block 456A, the system can obtain the server data. Further, as indicated at sub-block 456B, the system can process, using the global ML model, the server data to generate predicted output. Moreover, as indicated at sub-block 456C, the system can determine, based on the predicted output, a loss. Furthermore, as indicated at sub-block 456D, the system can generate, based on the loss, and based on the corresponding EWC loss term for each of the global weights, the server update for the global ML model.

At block 458, the system updates, based on the server update, the global weights of the global ML model to generate an updated global ML model. The system can update the global ML model to generate the updated global ML model in the same or similar manner described with respect to FIG. 1 (e.g., with respect to the remote ML training engine 162).

At block 460, the system determines whether one or more conditions are satisfied. The one or more conditions can include, for example, whether a threshold quantity of server updates have been utilized in updating the updated global ML model, whether a threshold duration of time has elapsed since the updated global ML model was updated, whether performance of the updated global ML model satisfies a threshold performance measure, and/or other conditions. Put another way, the one or more conditions can indicate whether the global ML model has been sufficiently updated to be deployed for utilization by the remote system and/or client devices. If, at an iteration of block 460, the system determines that the one or more conditions are not satisfied, then the system returns to block 456 to generate an additional server update for the global ML model, and proceeds to block 458 to further update, based on the additional server update, the global weights of the updated global ML model to generate a further updated global ML model. The system may return to block 456 and perform additional iterations of the method 400 for n iterations (i.e., where n is a positive integer). If, at an iteration of block 460, the system determines that the one or more conditions are satisfied, then the system proceeds to block 462.

At block 462, the system transmits, to further additional client devices, the updated global ML model. In some implementations, the client device can deploy the updated global ML model (e.g., assuming one or more conditions for deploying the updated global ML model are satisfied). In additional or alternative implementations, the client device can further determine an updated Fisher information for an additional client device data set (e.g., assuming one or more conditions for deploying the updated global ML model are not satisfied) to continue updating the updated global ML model. In these implementations, the system can perform additional iterations of the method 400 for m iterations (i.e., where m is a positive integer).

Figure 5:
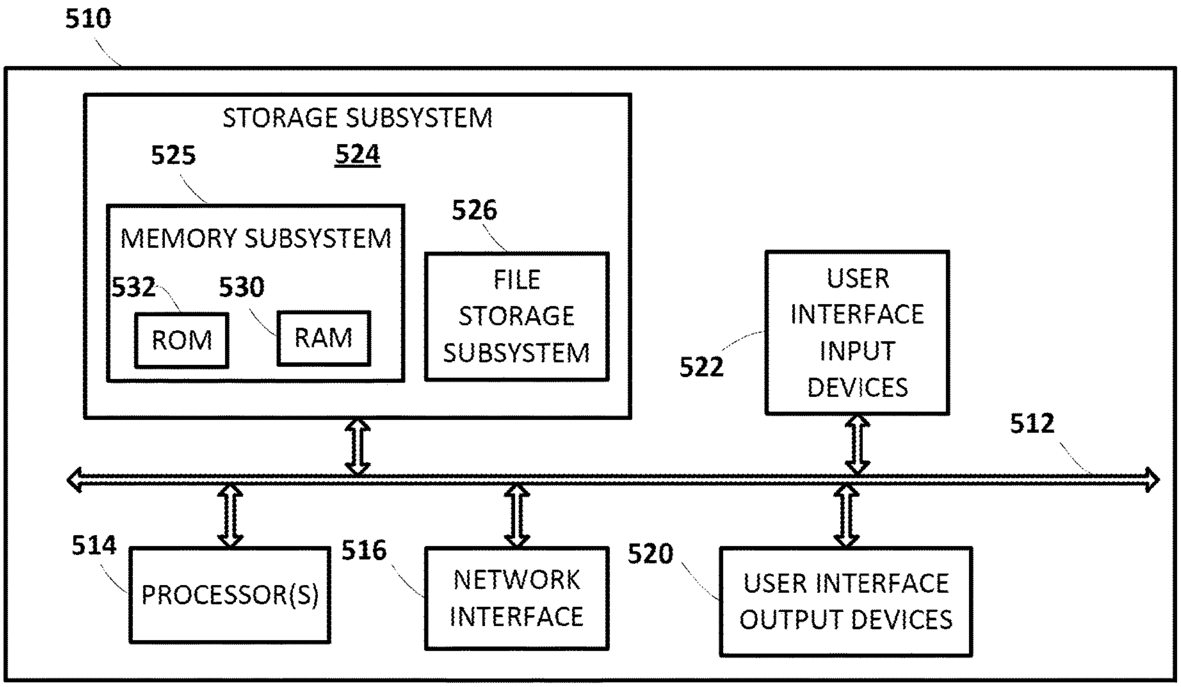
FIG. 5 depicts an example architecture of a computing device, in accordance with various implementations.

Turning now to FIG. 5, a block diagram of an example computing device 510 that may optionally be utilized to perform one or more aspects of techniques described herein is depicted. In some implementations, one or more of a client device, remote system, cloud-based automated assistant component(s), and/or other component(s) may comprise one or more components of the example computing device 510.

Computing device 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computing device 510. Network interface subsystem 516 provides an interface to outside networks and is coupled to corresponding interface devices in other computing devices.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 510 to the user or to another machine or computing device.

Storage subsystem 524 stores programming and data constructs that provide the functionality of some or all of the modules described herein. For example, the storage subsystem 524 may include the logic to perform selected aspects of the methods disclosed herein, as well as to implement various components depicted in FIGS. 1 and 2.

These software modules are generally executed by processor 514 alone or in combination with other processors. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computing device 510 communicate with each other as intended. Although bus subsystem 512 is shown schematically as a single bus, alternative implementations of the bus subsystem may use multiple busses.

Computing device 510 can be of varying types including a workstation, server, computing cluster, blade server, server farm, or any other data processing system or computing device. Due to the ever-changing nature of computers and networks, the description of computing device 510 depicted in FIG. 5 is intended only as a specific example for purposes of illustrating some implementations. Many other configurations of computing device 510 are possible having more or fewer components than the computing device depicted in FIG. 5.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method performed by one or more processors is provided, and includes receiving, at a client device and from a remote system, global weights of a global machine learning (ML) model; obtaining, at the client device, a client data set that is accessible locally at the client device and that is not accessible by the remote system; determining, at the client device, and based on the global weights of the global ML model, a Fisher information matrix for the client data set; transmitting, from the client device and to the remote system, the Fisher information matrix for the client data set; determining, at the remote system, based on the Fisher information matrix received from the client device and based on a plurality of additional Fisher information matrices received from corresponding additional client devices, a corresponding elastic weight consolidation (EWC) loss term for each of the global weights; generating, at the remote system, and based on processing corresponding server data remotely at the remote system and using the global ML model, and based on the corresponding EWC loss term for each of the global weights, a server update for the global ML model; and updating, at the remote system, and based on the server update, the global weights of the ML model to generate an updated global ML model.

These and other implementations of the technology can include one or more of the following features.

In some implementations, the method may further include, prior to receiving the global weights of the global ML model: pre-training the global ML model in a decentralized manner for a plurality of rounds of decentralized learning.

In some versions of those implementations, pre-training the global ML model in the decentralized manner for a given round of decentralized learning, of the plurality of rounds of decentralized learning, may include: identifying, at the remote system, a plurality of client devices that will participate in the given round of decentralized learning; transmitting, from the remote system and to each of the plurality of client devices, the global weights of the global ML model; receiving, at the remote system and from a given client device, of the plurality of client devices, a corresponding client update for the global ML model, the corresponding client update being generated locally at the given client device and based on processing client device data, that is accessible locally at the given client device and that is not accessible by the remote system, using the global ML model; and updating, at the remote system, and based on the corresponding client update received from the given client device and one or more additional corresponding client updates received from one or more further additional client devices, of the plurality of client devices, the global weights of the global ML model.

In some implementations, the method may further include, for n iterations, where n is a positive integer: continue generating, at the remote system, and based on processing the corresponding server data remotely at the remote system and using the global ML model, and based on the corresponding EWC loss term for each of the global weights, additional server updates for the global ML model; and continue updating, at the remote system, and based on the additional server updates, the global weights of the ML model to generate a further updated global ML model.

In some versions of those implementations, the method may further include, subsequent to the n iterations: determining, at the remote system, whether one or more conditions for deploying the further updated global ML model are satisfied; and in response to determining that the one or more conditions for deploying the further updated global ML model are satisfied: causing, by the remote system, the further updated global ML model to be deployed.

In some further versions of those implementations, the one or more conditions may include one or more of: whether a threshold quantity of server updates have been utilized in updating the further updated global ML model, whether a threshold duration of time has elapsed since the further updated global ML model was updated, or whether performance of the further updated global ML model satisfies a threshold performance measure.

In additional or alternative further versions of those implementations, the method may further include, subsequent to the n iterations: in response to determining that the one or more conditions for deploying the further updated global ML model are not satisfied: receiving, at an additional client device and from the remote system, the global weights of the further updated global ML model; obtaining, at the additional client device, an additional client data set that is accessible locally at the additional client device and that is not accessible by the remote system; determining, at the additional client device, and based on the global weights of the further updated global ML model, an updated Fisher information matrix for the additional client data set; and transmitting, from the additional client device and to the remote system, the updated Fisher information matrix for the additional client data set.

In some yet further versions of those implementations, the method may further include: determining, at the remote system, based on the updated Fisher information matrix received from the additional client device and based on a plurality of additional updated Fisher information matrices received from corresponding further additional client devices, an updated corresponding EWC loss term for each of the global weights; and, for m iterations, where m is a positive integer: continue generating, at the remote system, and based on processing the corresponding server data remotely at the remote system and using the global ML model, and based on the corresponding updated EWC loss term for each of the global weights, further additional server updates for the global ML model; and continue updating, at the remote system, and based on the further additional server updates, the global weights of the ML model to generate a yet further updated global ML model.

In some implementations, determining the corresponding EWC loss term for each of the global weights based on the Fisher information matrix received from the client device and based on the plurality of additional Fisher information matrices received from corresponding additional client devices may include: combining the Fisher information matrix received from the client device with the plurality of additional Fisher information matrices received from corresponding additional client devices to generate an aggregated Fisher information matrix; and determining the corresponding EWC loss term for each of the global weights based on the aggregated Fisher information matrix.

In some versions of those implementations, the corresponding EWC loss term for each of the global weights may correspond to a corresponding diagonal element of the aggregated Fisher information matrix.

In some additional or alternative versions of those implementations, combining the Fisher information matrix received from the client device with the plurality of additional Fisher information matrices received from corresponding additional client devices to generate the aggregated Fisher information matrix may include: averaging the Fisher information matrix received from the client device with the plurality of additional Fisher information matrices received from corresponding additional client devices to generate the aggregated Fisher information matrix.

In some implementations, determining the Fisher information matrix for the client data set based on the global weights of the global ML model may include: identifying a portion of the client data set; and determining, based on the portion of the client data set and based on the global weights of the global ML model, the Fisher information matrix.

In some implementations, generating the server update for the global ML model based on processing the corresponding server data and based on the corresponding EWC loss term for each of the global weights may include: obtaining the corresponding server data; processing, using the global ML model, the corresponding server data to generate predicted output; determining, based on the predicted output, a loss; and generating, based on the loss and based on the corresponding EWC loss term for each of the global weights, the corresponding server update.

In some versions of those implementations, determining the loss based on the predicted output may be using a supervised learning technique.

In additional or alternative versions of those implementations, determining the loss based on the predicted output may be using an unsupervised or semi-supervised learning technique.

In some implementations, the global ML model may be an audio-based global ML model that is utilized in processing audio data.

In some implementations, the global ML model may be a vision-based global ML model that is utilized in processing vision data.

In some implementations, the global ML model may be a text-based global ML model that is utilized in processing textual data.

In some implementations, a method performed by one or more processors of a client device is provided, and includes receiving, from a remote system, global weights of a global machine learning (ML) model; obtaining a client data set that is accessible locally at the client device and that is not accessible by the remote system; determining, based on the global weights of the global ML model, a Fisher information matrix for the client data set; and transmitting, to the remote system, the Fisher information matrix for the client data set. Transmitting the Fisher information matrix for the client data set to the remote system causes the remote system to: determine, based on the Fisher information matrix received from the client device and based on a plurality of additional Fisher information matrices received from corresponding additional client devices, a corresponding elastic weight consolidation (EWC) loss term for each of the global weights; generate, based on processing corresponding server data remotely at the remote system and using the global ML model, and based on the corresponding EWC loss term for each of the global weights, a server update for the global ML model; and update, based on the server update for, the global weights of the global ML model to generate an updated global ML model.

In some implementations, a method performed by one or more processors of a remote system is provided, and includes receiving, from a client device, a Fisher information matrix, the Fisher information matrix being generated locally at the client device based on global weights, of a global machine learning (ML) model, and for a client data set that is accessible locally at the client device and that is not accessible by the remote system; determining, based on the Fisher information matrix received from the client device and based on a plurality of additional Fisher information matrices received from corresponding additional client devices, a corresponding elastic weight consolidation (EWC) loss term for each of the global weights; generating, based on processing corresponding server data remotely at the remote system and using the global ML model, and based on the corresponding EWC loss term for each of the global weights, a server update for the global ML model; and updating, based on the server update, the global weights of the global ML model to generate an updated global ML model.

In addition, some implementations include one or more processors (e.g., central processing unit(s) (CPU(s)), graphics processing unit(s) (GPU(s), and/or tensor processing unit(s) (TPU(s)) of one or more computing devices, where the one or more processors are operable to execute instructions stored in memory, and where the instructions are configured to cause performance of any of the aforementioned methods. Some implementations also include one or more non-transitory computer readable storage media storing computer instructions executable by one or more processors to perform any of the aforementioned methods. Some implementations also include a computer program product including instructions executable by one or more processors to perform any of the aforementioned methods.

What is claimed is:

1. A method implemented by one or more processors, the method comprising:

receiving, at a client device and from a remote system, global weights of a global machine learning (ML) model;

obtaining, at the client device, a client data set that is accessible locally at the client device and that is not accessible by the remote system;

determining, at the client device, and based on the global weights of the global ML model, a Fisher information matrix for the client data set;

transmitting, from the client device and to the remote system, the Fisher information matrix for the client data set;

determining, at the remote system, based on the Fisher information matrix received from the client device and based on a plurality of additional Fisher information matrices received from corresponding additional client devices, a corresponding elastic weight consolidation (EWC) loss term for each of the global weights;

generating, at the remote system, and based on processing corresponding server data remotely at the remote system and using the global ML model, and based on the corresponding EWC loss term for each of the global weights, a server update for the global ML model; and updating, at the remote system, and based on the server update, the global weights of the global ML model to generate an updated global ML model, in response to determining, subsequent to updating the global weights of the global ML model to generate an updated global ML model, that one or more conditions for deploying the updated global ML model are not satisfied:

receiving, at an additional client device and from the remote system, the global weights of the updated global ML model;

determining, at the additional client device, and based on the global weights of the updated global ML model, an updated Fisher information matrix for an additional client data set;

transmitting, from the additional client device and to the remote system, the updated Fisher information matrix for the additional client data set; and updating, at the remote system, and based on the updated Fisher information matrix transmitted from the additional client device to the remote system, the global weights of the updated global ML model to generate a further updated global MIL model.

2. The method of claim 1, further comprising:

prior to receiving the global weights of the global ML model:

pre-training the global ML model in a decentralized manner for a plurality of rounds of decentralized learning.

3. The method of claim 2, wherein pre-training the global ML model in the decentralized manner for a given round of decentralized learning, of the plurality of rounds of decentralized learning, comprises:

identifying, at the remote system, a plurality of client devices that will participate in the given round of decentralized learning;

transmitting, from the remote system and to each of the plurality of client devices, the global weights of the global ML model;

receiving, at the remote system and from a given client device, of the plurality of client devices, a corresponding client update for the global ML model, the corresponding client update being generated locally at the given client device and based on processing client device data, that is accessible locally at the given client device and that is not accessible by the remote system, using the global ML model; and updating, at the remote system, and based on the corresponding client update received from the given client device and one or more additional corresponding client updates received from one or more further additional client devices, of the plurality of client devices, the global weights of the global ML model.

4. The method of claim 1, further comprising:

subsequent to the n iterations:

determining, at the remote system, whether one or more conditions for deploying the further updated global ML model are satisfied; and in response to determining that the one or more conditions for deploying the further updated global ML model are satisfied:

causing, by the remote system, the further updated global ML model to be deployed.

5. The method of claim 4, wherein the one or more conditions comprise one or more of: whether a threshold quantity of server updates have been utilized in updating the further updated global ML model, whether a threshold duration of time has elapsed since the further updated global ML model was updated, or whether performance of the further updated global ML model satisfies a threshold performance measure.

6. The method of claim 1, wherein determining the corresponding EWC loss term for each of the global weights based on the Fisher information matrix received from the client device and based on the plurality of additional Fisher information matrices received from corresponding additional client devices comprises:

combining the Fisher information matrix received from the client device with the plurality of additional Fisher information matrices received from corresponding additional client devices to generate an aggregated Fisher information matrix; and determining the corresponding EWC loss term for each of the global weights based on the aggregated Fisher information matrix.

7. The method of claim 6, wherein the corresponding EWC loss term for each of the global weights corresponds to a corresponding diagonal element of the aggregated Fisher information matrix.

8. The method of claim 6, wherein combining the Fisher information matrix received from the client device with the plurality of additional Fisher information matrices received from corresponding additional client devices to generate the aggregated Fisher information matrix comprises:

averaging the Fisher information matrix received from the client device with the plurality of additional Fisher information matrices received from corresponding additional client devices to generate the aggregated Fisher information matrix.

9. The method of claim 1, wherein determining the Fisher information matrix for the client data set based on the global weights of the global ML model comprises:

identifying a portion of the client data set; and determining, based on the portion of the client data set and based on the global weights of the global ML model, the Fisher information matrix.

10. The method of claim 1, wherein generating the server update for the global ML model based on processing the corresponding server data and based on the corresponding EWC loss term for each of the global weights comprises:

obtaining the corresponding server data;

processing, using the global ML model, the corresponding server data to generate predicted output;

determining, based on the predicted output, a loss; and generating, based on the loss and based on the corresponding EWC loss term for each of the global weights, the corresponding server update.

11. The method of claim 10, wherein determining the loss based on the predicted output is using a supervised learning technique.

12. The method of claim 10, wherein determining the loss based on the predicted output is using an unsupervised or semi-supervised learning technique.

13. The method of claim 1, wherein the global ML model is an audio-based global ML model that is utilized in processing audio data.

14. The method of claim 1, wherein the global ML model is a vision-based global ML model that is utilized in processing vision data.

15. The method of claim 1, wherein the global ML model is a text-based global ML model that is utilized in processing textual data.

16. A method implemented by one or more processors of a client device, the method comprising:

receiving, from a remote system, global weights of a global machine learning (ML) model;

obtaining a client data set that is accessible locally at the client device and that is not accessible by the remote system;

determining, based on the global weights of the global ML model, a Fisher information matrix for the client data set;

transmitting, to the remote system, the Fisher information matrix for the client data set, wherein transmitting the Fisher information matrix for the client data set to the remote system causes the remote system to:

determine, based on the Fisher information matrix received from the client device and based on a plurality of additional Fisher information matrices received from corresponding additional client devices, a corresponding elastic weight consolidation (EWC) loss term for each of the global weights;

generate, based on processing corresponding server data remotely at the remote system and using the global ML model, and based on the corresponding EWC loss term for each of the global weights, a server update for the global ML model;

update, based on the server update, the global weights of the global ML model to generate an updated global ML model;

determine whether one or more conditions for deploying the updated global ML model are satisfied; and in response to determining that one or more conditions for deploying the updated global ML model are not satisfied:

provide, to an additional client device, the global weights of the updated global ML model;

receive, from the additional client device, an updated Fisher information matrix for an additional client data set, wherein the updated Fisher information matrix is determined based on the global weights of the updated global ML model; and update, based on the updated Fisher information matrix received from the additional client device, the global weights of the updated global ML model to generate a further updated global ML model.

17. A method implemented by one or more processors of a remote system, the method comprising:

receiving, from a client device, a Fisher information matrix, the Fisher information matrix being generated locally at the client device based on global weights, of a global machine learning (ML) model, and for a client data set that is accessible locally at the client device and that is not accessible by the remote system;

determining, based on the Fisher information matrix received from the client device and based on a plurality of additional Fisher information matrices received from corresponding additional client devices, a corresponding elastic weight consolidation (EWC) loss term for each of the global weights;

generating, based on processing corresponding server data remotely at the remote system and using the global ML model, and based on the corresponding EWC loss term for each of the global weights, a server update for the global ML model;

updating, based on the server update, the global weights of the global ML model to generate an updated global ML model;

determining whether one or more conditions for deploying the updated global ML model are satisfied; and in response to determining that one or more conditions for deploying the updated global ML model are not satisfied:

providing, to an additional client device, the global weights of the updated global ML model;

receiving, from the additional client device, an updated Fisher information matrix for an additional client data set, wherein the updated Fisher information matrix is determined based on the global weights of the updated global ML model; and updating, based on the updated Fisher information matrix received from the additional client device, the global weights of the updated global ML model to generate a further updated global ML model.

* * * * *